United States Patent [19]

Hansen

[11] Patent Number: 5,620,181

[45] Date of Patent: Apr. 15, 1997

[54] SIGNALING DEVICE FOR AMUSEMENT GAME

[75] Inventor: Bryan P. Hansen, DesPlaines, Ill.

[73] Assignee: Capcom Coin-Op, Inc., Arlington Heights, Ill.

[21] Appl. No.: 392,538

[22] Filed: Feb. 23, 1995

[51] Int. Cl.⁶ .................................................. A63F 7/30
[52] U.S. Cl. .................... 273/118 A; 273/118 R; 273/127 R
[58] Field of Search ...................... 273/118, 119, 273/121, 127 R; 362/32, 253, 322, 280, 293

[56] References Cited

U.S. PATENT DOCUMENTS

| | | | |
|---|---|---|---|
| 4,693,556 | 9/1987 | McCaughan, Jr. | 362/32 X |
| 5,184,253 | 2/1993 | Hwang | 362/32 X |
| 5,255,916 | 10/1993 | Bleich | 273/118 R X |
| 5,301,090 | 4/1994 | Hed | 362/32 |
| 5,345,531 | 9/1994 | Keplinger et al. | 362/32 X |
| 5,529,294 | 6/1996 | Nordman et al. | 273/127 R X |

*Primary Examiner*—Raleigh W. Chiu

[57] ABSTRACT

A signaling device for an amusement game including a playfield having a plurality of triggering devices disposed thereon electrically linked to a microprocessor. A plurality of light sources are mounted behind the playfield which are capable of being activated either singularly or in combination by the microprocessor to produce a predetermined color of light. An optical receptor is disposed on the playfield and is optically connected to the plurality of light sources through an optical lead whereby the optical receptor will become illuminated in the color generated by the plurality of light sources. The color generated by the light sources and, therefore, the color in which the optical receptor will illuminate may be changed to either signal a successful activation of a specified triggering device or signal which triggering device should next be activated.

9 Claims, 3 Drawing Sheets

SIGNALING DEVICE FOR AMUSEMENT GAME

BACKGROUND OF THE INVENTION

This invention relates generally to amusement games and, more particularly, relates to a signaling device for relaying information to a user of a pinball machine As far as applicant is aware, a signaling device of the type described in this specification is a new innovation for relaying information to a user of a pinball machine. Although lights have been used in the past to provide information during pinball play, the applicant is unaware of any device utilizing multiple colored light sources whose outputs are capable of being optically transmitted to a light receptor to achieve this general objective.

SUMMARY OF THE INVENTION

In accordance with the present invention a signaling device for an amusement game including a playfield having a plurality of triggering devices disposed thereon electrically linked to a microprocessor is provided. The signaling device comprises a plurality of light sources mounted to the playfield which are capable of being activated either singularly or in combination by the microprocessor to produce a predetermined color of light. An optical receptor is disposed on the playfield and is optically connected to the plurality of light sources through an optical lead whereby the optical receptor will become illuminated in the color generated by the plurality of light sources. The color generated by the light sources and, therefore, the color in which the optical receptor will illuminate may be changed to either signal a successful activation of a specified triggering device or signal which triggering device should next be activated.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiments shown in the following drawings in which.

DETAILED DESCRIPTION

While the invention can be used generally in amusement games it will be described hereinafter in the context of an apparatus for use in conjunction with a coin operated pinball machine as the preferred embodiment thereof.

Figure 1:
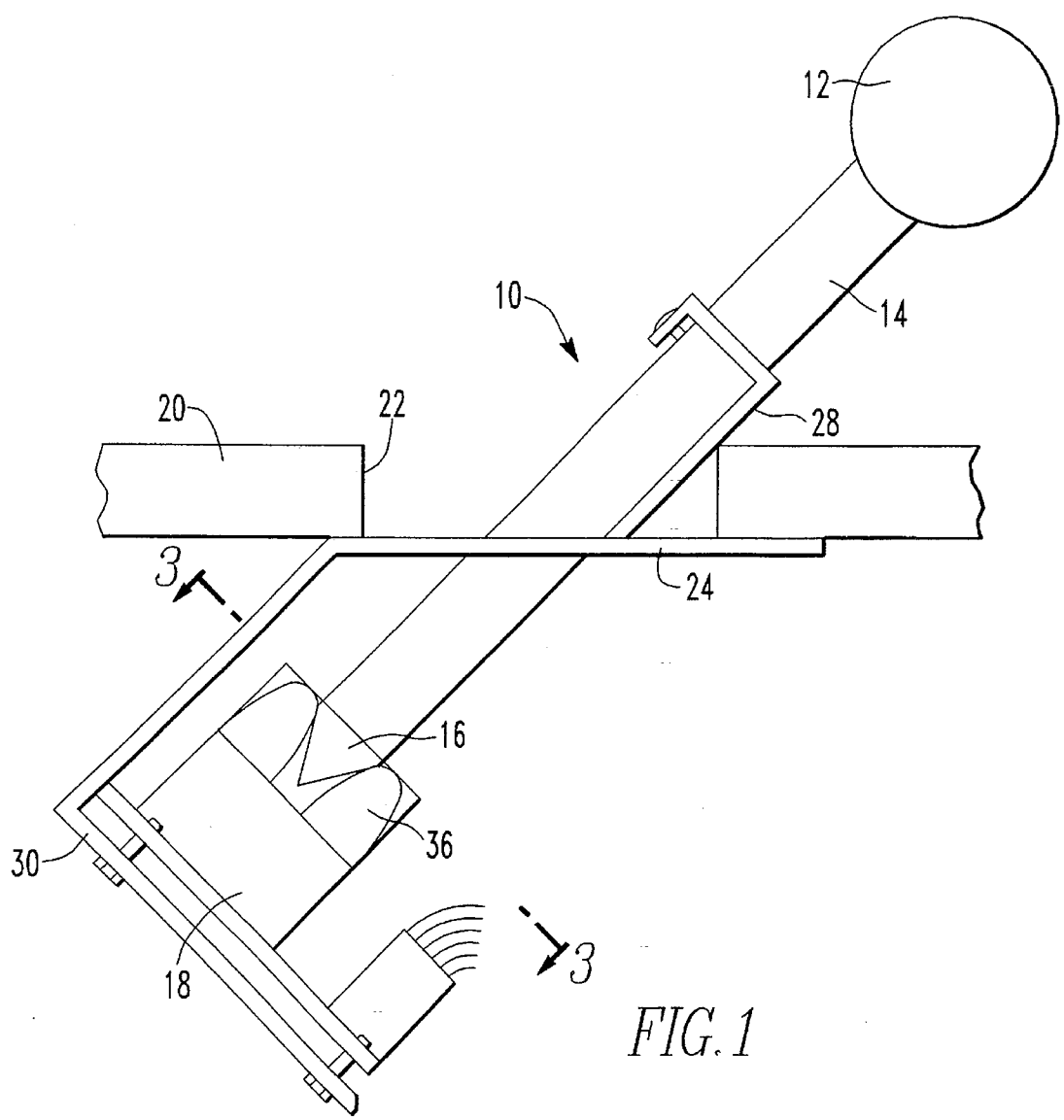
FIG. 1 is a side view of the apparatus which is the subject of the present invention.
Figure 4:
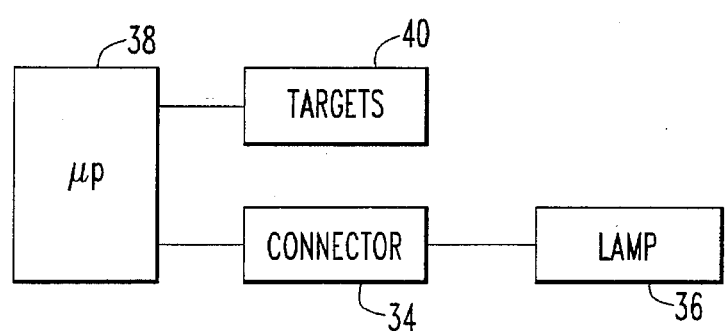
FIG. 4 is a schematic diagram showing the general circuitry used in conjunction with the apparatus shown in FIG. 1.
Figure 2:
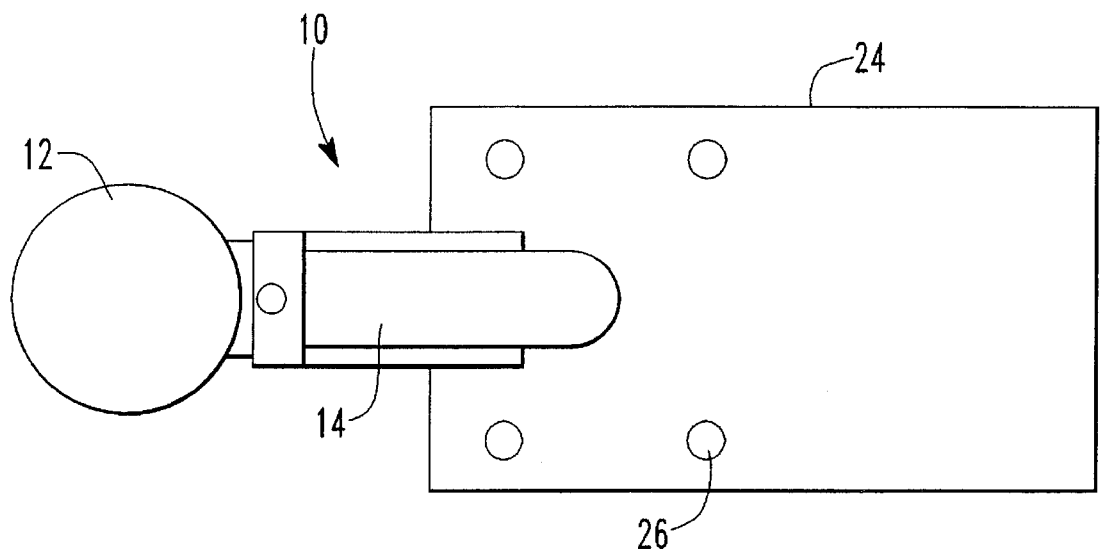
FIG. 2 is top view of the apparatus shown in FIG. 1.
Figure 3:
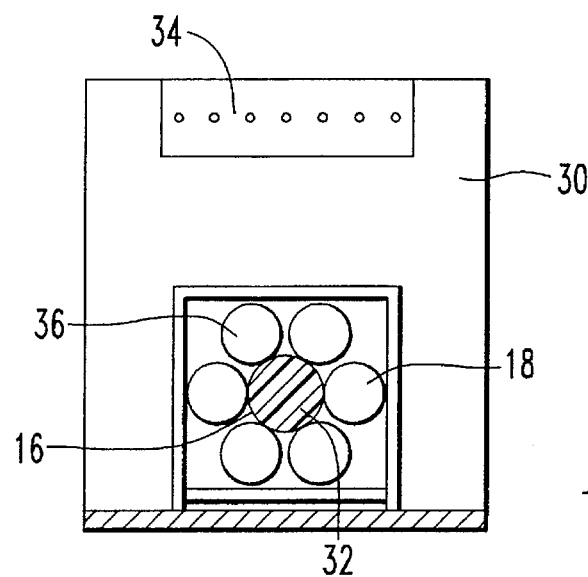
FIG. 3 is a sectional view along line III—III in FIG. 1.

Referring now to the figures, wherein like reference numerals refer to like elements, there is shown in FIGS. 1 and 2 a spectrum ball assembly 10. The assembly comprises an optical receptor 12 connected to an optical lead 14. In the embodiment shown, the optical receptor 12 is shaped in the form of a sphere, although other shapes, such as a cube or diamond for example, are contemplated. The optical receptor 12 and optical lead 14 are preferably integrally molded from a clear plastic, lucite, or the like. The optical lead 14 in the preferred embodiment is shaped generally as a cylinder having one end leading to the optical receptor 12. The end 16 opposite the optical receptor 12 is preferably tapered and extends into light source housing 18. In another embodiment, the optical lead 14 may be a fiber optic cable connected to the optical receptor 12.

The optical assembly 10 is positioned on the pinball playfield 20 such that the optical receptor 12 is disposed in view of the player while the optical lead 14 passes through an opening 22 in the playfield 20 to the light source housing 18 and related components. The light source housing 18 and related components are preferably disposed out of view of the player underneath the playfield 20. It is contemplated, however, that the optical receptor 12 and the light source housing 18 could be positioned in any manner with relation to the playfield 20 so long as the player is able to view the optical receptor 12 in some form.

To attach the spectrum ball assembly 10 to the playfield 20 a bracket 24 may be provided to which the spectrum ball assembly 10 is securely connected. The bracket 24 preferably is mounted on the underside of the playfield 20 by screws or the like which are passed through mounting holes 26 in bracket 24 directly into the underside of the playfield. The bracket 24 may also be provided with an extension 28 which passes through opening 22 in playfield 20 for further supporting and securing the optical lead 14 and optical receptor 12. The extension 28 may also be positioned to optionally cover the optical lead 14 from view. The hole 22 may be covered or filled after the assembly is secured to the playfield 20.

As mentioned, the light source housing 18 is mounted to the underside of playfield 18 and directly linked to optical lead 14. In the illustrative embodiment, the light source housing 18 is mounted by being attached to a second extension 30 of bracket 24. Specifically, the light source housing 18 is attached to the second extension 30 such that the tapered end 16 of optical lead 14 is inserted into an opening 32 in the center thereof. Also mounted on the second extension 30 is an electrical connector 34. Electrical connector 34 is provided to link light sources 36 mounted within the light source housing 18 to a microprocessor or the like 38 which is in turn connected to triggering devices such as targets or the like 40 whereby the microprocessor may control activation of the lights in response to playing conditions in a manner familiar to those skilled in the art.

The light sources 36 are arranged within the light source housing 18 such that they are optically connected to optical lead 14. In the embodiment shown, there are positioned circumferentially around the tapered end 16 of optical lead 14 six light sources 36 of differing color such that each light source 36 is positioned adjacent the tapered end 16. Each light source 36 may be a colored lamp, light emitting diode, or the like which is controlled by the microprocessor as discussed previously. As each light source 36 is activated, the light generated therefrom will travel along optical lead 14 to optical receptor 12 which will in turn become illuminated the color of the light source 36 activated. As such, a single optical receptor is capable of becoming illuminated in a multitude of colors without the need for providing multiple light sources on the playfield.

Figure 5:
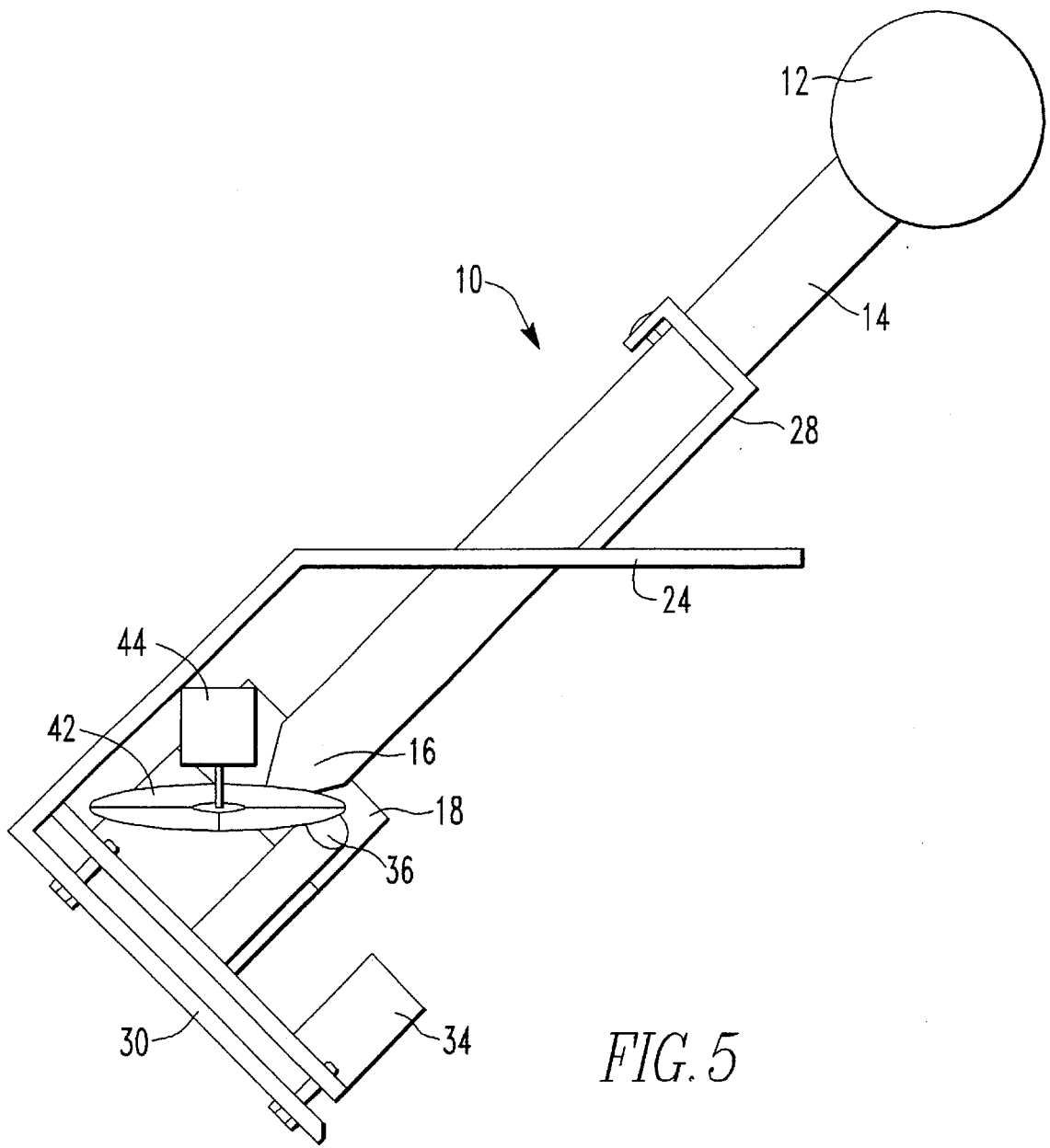
FIG. 5 is a side view of an alternative embodiment of the present invention

In an alternate embodiment, seen in FIG. 5, a single light source 36 is employed. Positioned between the light source 36 and the optical lead 14 is a disc 42 which is mounted to a motor or the like 44. The disc 42 is provided with a number of different colored, transparent sections. During operation, the microprocessor 38 controls the motor 44 to rotate the disc 42 to a position such that one of the sections is positioned between the light source 36 and the optical lead 14 whereby the light received by the optical lead, and thus transferred to the optical receptor, is the color of the colored, transparent section. By changing which section is positioned between the light source 36 and the optical lead 14 the color of the optical receptor may be controlled.

During play, it is envisioned that the color changes of the spectrum ball may be utilized to either instruct the player as to which triggering devices need to be activated or as a reward in response to target activations. Specifically, the spectrum ball could be illuminated a specific color corresponding to a specific target or targets on the playfield thereby signaling to the player that these targets must be activated to enhance play. Alternatively, the spectrum ball could change colors in response to activation of a specific target or targets on the playfield whereby the color changes of the spectrum ball signal to the player that the targets have indeed been activated and the goal achieved.

It should be apparent from the preceding description that this invention has among other advantages, the advantage of providing a pinball game illusion that is capable of imparting information to the player. It is believed that the illusion will enhance the enjoyment of the game which in turn should give the player incentive to continue play.

It is to be understood that the descriptions and drawings shown with respect to the present invention are not limiting and that other optical spectrum ball arrangements utilizing the concepts of the present disclosure are contemplated.

While specific embodiments of the invention have been described in detail, it will be appreciated by those skilled in the are that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. An amusement game, comprising:
   a playfield;
   a triggering device disposed on said playfield;
   a microprocessor electrically linked to said triggering device and responsive to an activation thereof;
   a light source controlled by said microprocessor for producing a color of light in response to said activation of said triggering device;
   an optical lead optically connected to said light source; and
   an optical receptor optically connected to said optical lead whereby said optical receptor will become illuminated in said color of light.

2. The amusement game of claim 1, wherein said light source is disposed underneath said playfield and said optical receptor is disposed on said playfield.

3. The amusement game of claim 2, wherein said optical receptor is generally shaped as a sphere.

4. The amusement game of claim 3, wherein said optical receptor and optical lead are integrally molded from plastic and wherein said optical lead is generally cylindrical in shape.

5. The amusement game of claim 4, wherein said optical lead has a tapered end and wherein said light source comprises a plurality of colored lamps arranged circumferentially adjacent said tapered end.

6. The amusement game of claim 4, wherein said light source comprises a lamp and a transparency having a plurality of colored sections wherein said sections are movable to a position between said lamp and said optical lead.

7. A method of playing an amusement game comprising a playfield, a plurality of triggering devices disposed on said playfield, a microprocessor electrically linked to said triggering devices, a plurality of light sources capable of being activated either singularly or in combination by said microprocessor to produce a color of light, an optical lead optically connected to each of said plurality of light sources, and an optical receptor optically connected to said optical lead whereby said optical receptor will become illuminated in the color of said light, the method comprising the steps of:
   activating said plurality of light sources whereby said optical receptor will display a first color of light to indicate a first one of said plurality of triggering devices to be activated;
   monitoring with said microprocessor said first one of said plurality of triggering devices to detect activation thereof; and
   activating said plurality of light sources in response to activation of said first one of said plurality of triggering devices whereby said optical receptor will display a second color of light to indicate a second one of said plurality of triggering devices to be activated.

8. A method of playing an amusement game comprising a playfield, a plurality of triggering devices disposed on said playfield, a microprocessor electrically linked to said triggering devices, a plurality of light sources capable of being activated either singularly or in combination by said microprocessor to produce a color of light, an optical lead optically connected to each of said plurality of light sources, and an optical receptor optically connected to said optical lead whereby said optical receptor will become illuminated in the color of said light, the method comprising the steps of:
   monitoring with said microprocessor a first one of said plurality of triggering devices to detect activation thereof; and
   activating said plurality of light sources in response to activation of said first one of said plurality of triggering devices whereby said optical receptor will become illuminated a predetermined color of light to indicate said first one of said plurality of triggering devices has been activated.

9. An amusement game, comprising:
   a playfield having an opening therethrough;
   a plurality of triggering devices disposed on said playfield;
   a microprocessor electrically linked to said triggering devices and responsive thereto;
   a plurality of light sources mounted underneath said playfield capable of being activated either singularly or in combination by said microprocessor to produce a color of light;
   an optical receptor, generally shaped as a sphere and disposed on said playfield, having a generally cylindrical in shape optical lead integrally attached thereto, said optical lead linking said optical receptor to said plurality of light sources through said opening in said playfield whereby said optical receptor will become illuminated in said color of light; and
   wherein said optical lead has a tapered end portion disposed adjacent said plurality of light sources to optically connect said optical lead thereto.

* * * * *